United States Patent [19]

Lindmayer

[11] Patent Number: 4,755,324
[45] Date of Patent: Jul. 5, 1988

[54] THERMOLUMINESCENT MATERIAL

[75] Inventor: Joseph Lindmayer, Rockville, Md.

[73] Assignee: Quantex Corporation, Rockville, Md.

[21] Appl. No.: 798,297

[22] Filed: Nov. 15, 1985

[51] Int. Cl.$^4$ .................. C09K 11/50; C09K 11/477
[52] U.S. Cl. ................................................ 252/301.4 S
[58] Field of Search .................................. 252/301.4 S

[56] References Cited

U.S. PATENT DOCUMENTS

| | | | |
|---|---|---|---|
| 2,521,124 | 9/1950 | Miller | 252/301.4 S |
| 2,527,365 | 10/1950 | Leverenz | 252/301.4 S |
| 2,979,467 | 4/1961 | Keller | 252/301.4 S |
| 4,374,037 | 2/1983 | Takahashi | 252/301.4 S |

FOREIGN PATENT DOCUMENTS 57-202373  12/1982  Japan .............................. 252/301.4 S

*Primary Examiner*—Jack Cooper
*Attorney, Agent, or Firm*—Peter C. Van Der Sluys

[57] ABSTRACT

Materials having thermoluminescent properties use a base material and two dopants and made from a process of mixing the parts together, heating the mixture to fuse together, grinding the mass into a fine powder, and reheating the powder. The resultant powder may be combined with a vehicle to form a paint. A fusible salt may be used in making the thermoluminescent material. The dopants may be $Eu_2O_3$, $Sm$, $CeO_2$, and/or $La_2O_3$.

6 Claims, 1 Drawing Sheet

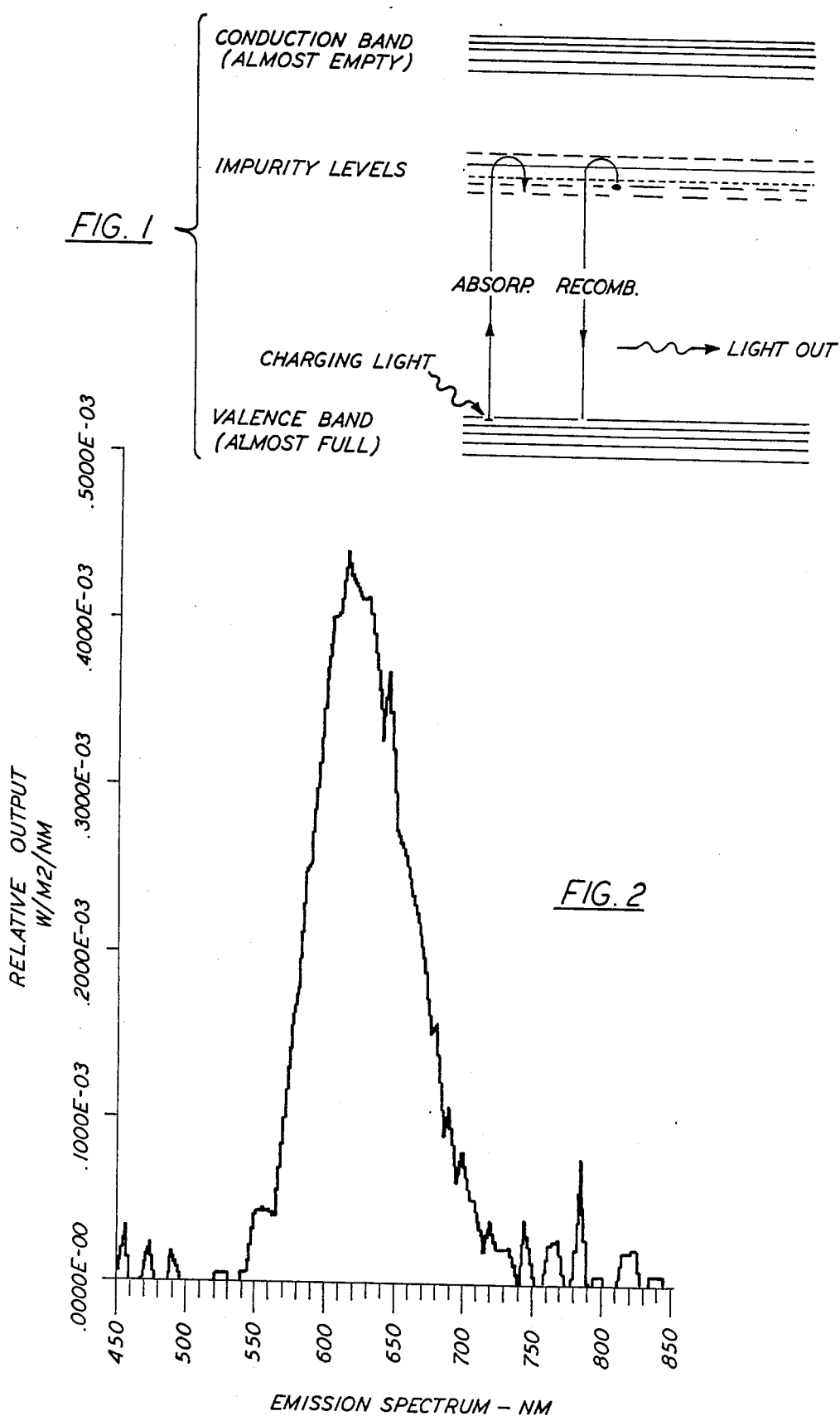

THERMOLUMINESCENT MATERIAL

BACKGROUND OF THE INVENTION

This invention relates to thermoluminescent material and associated uses and associated process for making thermoluminescent material.

"Thermoluminescence" is often used to mean any luminescence appearing in a material due to the application of heat. However, as used hereafter "thermoluminescence" refers to the emission of light due to the freeing of trapped electrons by application of thermal energy.

Many solids that contain luminescent centers often contain one or more types of centers that trap electrons. Upon application of suitable wavelengths of light or application of x-rays, such solids produce free electrons. Upon removal of the energizing light, x-rays, or other radiation, the free electrons may be trapped at an energy level higher then their ground state. If the depth of the trap (that is, the amount of energy required to relese the electron from the trap) is large and the temperature is low, the electron will remain trapped for a long time. However, if the trap depth is sufficiently low, the solid may receive sufficient thermal energy to free such trapped electrons even at room temperature. An electron freed from a trap will return to its ground state and emit a photon.

Thermoluminescene may be characterized as a type of phosphorescence. Phosphorescence is generally considered as delayed light emission after the removal of a source of exciting energy used to cause electrons to assume an energy state higher then their ground level. Such "phosphorescence", often called "afterglow", will be used herein to refer to delayed emission having a duration which becomes shorter with increasing temperature.

Although various thermoluminescent materials have been heretofore developed, practical uses of such materials has been limited due to numerous limitations in the materials themselves. For example, some materials require a relatively high energy input (light used to excite electrons) in order to trap a sufficient number of electrons to provide a relatively low afterglow effect. On the other hand, materials which are more efficient at trapping electrons may have trap depths which preclude room temperature level thermal energy from releasing the electrons and causing the light emission. Although the latter materials may be useful for other phenomena, such trap depths are not desireable or suitable for thermoluminescent material. Materials which have a very low electron trap depth do not store electrons sufficiently securely to allow an afterglow effect to last for an appreciable time after removal of the light or other energy used to excite the electrons. That is, the afterglow effect might be noticeable for a relatively short period of time (under one second), but the emission of light due to room temperature level of thermal energy may not be at all noticeable in such materials after a slightly longer period of time (10 seconds).

The above and other limitations were disadvantageous of previously available thermoluminescent material has greatly limited the possible applications for using the phenomena of thermoluminescence. Additionally, the range of possible uses for thermoluminescent material has been limited by the restrictions in form of various thermoluminescent materials.

As used herein, "thermoluminescent material" shall refer to material having an afterglow which is perceptable by an unaided human eye and having a time duration depended upon the temperature.

OBJECTS AND SUMMARY OF THE INVENTION

Accordingly, it is the primary object of the present invention to provide a new and improved thermoluminescent material.

A more specific object of the present invention is to provide thermoluminescent material providing for a relatively high density of trapped electrons for a relatively low amount of input excitation energy.

A still further object of the present invention is to provide a thermoluminescent material having desirable electron trap depth characteristics.

Yet another object of the present invention is to provide thermoluminescent material which provides afterglow for a relatively long period of time after excitation energy has been removed.

A still further object of the present invention is to provide various uses for thermoluminescent material.

A still further object of the present invention is to provide thermoluminescent material in a form suitable for numerous uses.

Another object of the present invention is to provide a paint having thermoluminescent material.

Yet another object of the present invention is to provide a process for making thermoluminescent material into a highly useful form.

The present invention may be described as a crystalline thermoluminescent material consisting essentially of: base material selected from the group of: alkaline earth metal sulfides and selenides; a fusible salt, there being at most 2 parts fusible salt for every 10 parts of base material by weight; first and second dopants, the first and second dopant selected from the group of lanthanum oxide and europium oxide, and the second dopant being an oxide of a different lanthanide series element, there being collectively at most 8000 parts per million of the first and second dopants; and wherein the thermoluminescent material provides electron trapping with trap depths less than 0.150 eV and more than 0.020 eV.

Instead of using a fusible salt as the carrier for the dopants, the dopants can be diffused by a gasous diffusion method in an inert gas such as $N_2$ carring the dopants. The first dopant is preferably lanthanum oxide and the second dopant is europium trioxide.

The process of the present invention comprises the steps of: mixing: a base material selected from the group of alkaline earth metal sulfides and selenides, fusible salt, there being at most 2 parts fusible salt for every 10 parts of base material by weight, lanthanum oxide, and europium trioxide, there being collectively at most 8000 parts per million of the lanthanum oxide and europium trioxide; after the mixing, heating the resultant mixture at a heating temperature sufficient to fuse the mixture into a crystalline form; after the heating, grinding the resultant crystalline form into a powder; and after the grinding, reheating the resultant powder at a reheating temperature below the heating temperature and sufficient to repair crystal edges of the powder to yield a thermoluminescent material without fusing the powder into a mass. The lanthanum oxide and europium trioxide are mixed in such quantities that the resultant powder has between 1000 and 7000 parts per million of lanthanum oxide, preferably 3000 plus or minus 10% parts per million of lanthanum oxide, and between 500 and 1000 parts per million of europium trioxide, preferably 750 plus or minus 10% parts per million of europium trioxide. The process may further include the step of, after the reheating, placing the powder into a liquid vehicle to form a thermoluminescent paint. The process may further include the step of applying the thermoluminescent paint to a traffic marker. The base material used for the process may be strontium sulfide. The process may further include the step, after the reheating, placing the powder into a vehicle to form thermoluminescent cosmetic material. The process may alternately include the step of, after the reheating, binding the thermoluminescent material to a textile material.

In general after glow of the materials of the invention are temperature dependent and the period of after glow can be expressed as 1/Time that is after glow decreases inversely with time. Similar results were found in electronic currents in insulators as discussed in my article "Current Transient in Insulators" Journal of Applied Physics, Vol. 36 No. 1, 196-201, January 1965.

BRIEF DESCRIPTION OF THE DRAWING

The above and other features of the present invention will be more readily understood when the following detailed description is considered in conjunction with the accompanying drawings wherein:

FIG. 1 shows a diagram illustrating electron trapping as exhibited by the present invention.

FIG. 2 shows an emission spectrum of an embodiment of the present invention.

DETAILED DESCRIPTION

FIG. 1 shows the principle of operation of the material of the present invention. An electron at a valence band is trapped at an inpurity level by absorbtion of light as shown at the left side of the diagram, whereas thermal energy may cause the electron to overcome a trap depth and return to valence band (right side of diagram) causing the emission of a photon.

When the thermoluminescent material is mixed with a vehicle or binder to form a paint the painted objects will glow upon illumination by light. This means the headlight of an automobile, lights of an airplane, lights of ships, will cause energy stored inside of the paint to glow. Such paint has utility as coatings for guard rails on roads, traffic signs, bridge rails, radio towers, high objects near airports, construction machinery, ship markings, oil platforms, painted lanes, roadside markers, bridge pylons, powerline towers, fences, rear markers for vehicles, buoys and many others. It is also contemplated that the thermoluminescent materials of the present invention maybe mixed with conventional fingernail polish to thereby provide a striking warm glow to the nails of the wearer.

Examples of typical vehicals for use with the thermoluminescent materials of the invention are:

Nail Polish (for 10 ml)

3-5 gr. nail polish clear;
1.0 gr. butzl ocetate;
0.3 gr. acetone
1.5 gr. thermoluminescent material
3.0 gr. nail polish colored such as ice pink "Sun Lite" night glow paint 72% by wgt alkaloid base clear paint
1% colored pigment
2% disburing additives
25% thermoluminescent material (percentage by weight)

As hereinbefore set forth the first fusion temperature is about 1100 degrees C. and the second heating temperature is about 600° C. The first fusion temperature may be from about 1000° C. to about 1200° C. and the second heating temperature from about 600° C. to about 650° C. Within these limits satisfactory materials are produced.

EXAMPLE I

The crystalline thermoluminescent material may consist essentially of: a base material selected from the group of: alkaline earth metal sulfides, and selenides; a fusible salt, there being at most 2 parts fusible salt for every 10 parts of base material by weight; lanthanum oxide; and europium trioxide; and wherein there is collectively at most 8000 parts per million of the lanthanum oxide and the europium trioxide. The thermoluminescent material provides electron trapping with trap depths less than 0.150 eV and more than 0.020 eV. The thermoluminescent material has between 1000 and 7000 parts per million of lanthanum oxide, preferably 3000 plus or minus 10% parts per million of lanthanum oxide. The thermoluminescent material has between 500 and 1000 parts per million of europium trioxide, preferably 750 plus or minus 10% parts per million of europium trioxide. The base material is strontium sulfide. The fusible salt maybe lithium fluoride and there is between 1 and 3 parts fusible salt for 64 parts of base material by weight. The thermoluminescent material is in the form of powder having crystalline granules. The thermoluminescent material maybe combined with a liquid vehicle to form a paint. As used herein, "paint" shall mean any material commonly refered to as a paint, dye, or other coloring agent.

EXAMPLE II

A mixture is made having the following composition:
96% Sr S
3% Li F
3000 ppm $La_2O_3$
750 ppm $Eu_2O_3$ The mixture is heated to about 1,000 degrees C. in a furnace in an atmosphere of dry nitrogen to form a fused mass.

The fused mass is ground to a fine powder having particle size less than 38 microns.

After grinding, the powdered material is heated at about 600 degrees C. and below fusing temperature for 30 minutes. The resultant material has the emission spectrum of FIG. 2.

The cooled reheated powder may then be mixed with a suitable binder or vehicle to form a paint.

EXAMPLE III

A mixture is made having the following composition:
95% Sr S
4% Li F
7000 ppm $La_2O_3$
1000 ppm $Eu_2O_3$ The mixture is heated to about 1,100 degrees C. in a furnace to form a fused mass.

The fused mass is ground to a fine powder having particle size no larger than 38 microns.

After grinding, the powdered material is heated at about 600 degree C. and below fusing temperature for 30 minutes.

The cooled reheated powder may then be mixed with a suitable binder or vehicle to form a paint.

EXAMPLE IV

A mixture is made having the following composition:
96% Sr S
3% Li F
1000 ppm $La_2O_3$
500 ppm $Eu_2O_3$ The mixture is heated to about 1,000 degree C. in a furnace to form a fused mass.

The fused mass is ground to a fine powder.

After grinding, the powered material is heated at about 600 degrees C. and below fusing temperature for 30 minutes.

The cooled reheated powder may then be mixed with a suitable binder or vehicle to form a paint.

EXAMPLE V

A mixture is made having the following composition:
SrSe—86% by wgt.
$SrCl_2$—10% by wgt
CaS—4% by wgt
$Eu_2O_3$—2,000 ppm
Sm—2,000 ppm The mixture is heated to about 1,000° C. in a furnace to form a fused mass.

The fused mass is ground to a fine powder.

After grinding the powered material is heated at about 600° C. and below fusing temperature for 30 minutes.

The cooled reheated powder may then be mixed with a suitable binder or vehicle to form a paint.

EXAMPLE VI

A mixture is made having the following composition:
100 parts by wgt SrS
10 parts by wgt LiF
600 ppm by wgt $Eu_2O_3$
600 ppm by wgt $CeO_2$ The mixture is heated to about 1,100° C. in a furnace to form a fused mass.

The fused mass is ground to a fine powder.

After grinding the powered material is heated at about 600° C. and below fusing temperature for 30 minutes.

The cooled reheated powder may then be mixed with a suitable binder or vehicle to form a paint.

From the above examples, the invention will be seen in its broad aspects as including a base material of alkaline earth metal sulfides or selenides, a first dopant of lanthanum oxide or a europium compound, and a second dopant of a lanthanide or a compound of a lanthanide. The europium compound may be an oxide or other compound such as fluoride, chloride, or other halide, nitride, or sulfide. The lanthanide compound may be an oxide or other compound such as fluoride, chloride, or other halide, nitride, or sulfide.

As used herein, percentages and parts for mixtures are by weight unless indicated otherwise.

Although specific illustrative examples have been presented herein, various modifications will be apparent. Accordingly, the scope of the present invention should be determined by reference to the claims appended hereto.

What is claimed is:

1. A crystalline thermoluminescent material consisting essentially of:
   (a) a base material selected from the group of: alkaline earth metal sufides, and selenides;
   (b) a first dopant consisting of lanthanum oxide in an amount of between 1000 and 7,000 parts per million; and
   (c) a second dopant consisting of europium trioxide in an amount of between 500 and 1,000 parts per million; and wherein said thermoluminescent material provides electron trapping with trap depths less that 0.150 eV and more than 0.020 eV.

2. The thermoluminescent material of claim 1 wherein said thermoluminescent material has 3000 plus or minus 10% parts per million of lanthanum oxide.

3. The thermoluminescent material of claim 1 wherein said thermoluminescent material has 750 plus or minus 10% parts per million of europium trioxide as the second dopant.

4. The thermoluminescent material of claim 1 wherein said base material is strontium sulfide.

5. The thermoluminescent material of claim 1 wherein said thermoluminescent material is in the form of powder having crystalline granules.

6. The thermoluminescent material of claim 1 wherein said material has 3000 plus or minus 10% parts per million of lanthanum oxide and 750 plus or minus 10% parts per million of europium trioxide.

* * * * *